United States Patent [19]
Rao et al.

[11] 3,952,109
[45] Apr. 20, 1976

[54] LOW SALT PROTEIN HYDROLYZATES
[75] Inventors: Ganta V. Rao, Hutchinson; Oliver B. Gerrish, Atchison, both of Kans.
[73] Assignee: Far-Mar-Co., Inc., Hutchinson, Kans.
[22] Filed: Mar. 5, 1975
[21] Appl. No.: 555,450

Related U.S. Application Data
[63] Continuation-in-part of Ser. No. 332,200, Feb. 13, 1973, abandoned.

[52] U.S. Cl. ................................ 426/48; 426/52; 426/533; 426/650
[51] Int. Cl.² .......................................... A23L 1/231
[58] Field of Search .................. 426/48, 49, 52, 56, 426/648, 650, 533

[56] References Cited
UNITED STATES PATENTS
| | | | |
|---|---|---|---|
| 2,965,490 | 12/1960 | Rusoff | 426/352 |
| 3,493,395 | 2/1970 | Soeters | 426/533 |
| 3,532,514 | 10/1970 | May | 426/533 |
| 3,617,300 | 11/1971 | Borochoff et al. | 426/48 X |

*Primary Examiner*—A. Louis Monacell
*Assistant Examiner*—Esther L. Massung
*Attorney, Agent, or Firm*—Stuart J. Friedman

[57] ABSTRACT

A process for preparing substantially salt-free, sugar-based flavor enhancers comprises hydrolyzing protein in hydrochloric acid; liquefying starch, preferably with alpha-amylase; and admixing the hydrolyzed protein, the liquefied starch and an enzyme selected from amyloglucosidase and β-D glucoside glucohydrolyase at a pH in the range 3.5 to 5, preferably 3.5 to 4.0, and a temperature in the range 40° to 75°C, preferably 60°C, whereby the enzyme and the liquefied starch react in situ to produce reducing sugars which in turn react with the hydrolyzed protein to form the substantially salt-free, sugar-based protein hydrolyzates.

39 Claims, No Drawings

LOW SALT PROTEIN HYDROLYZATES

CROSS-REFERENCE TO RELATED APPLICATIONS

This is a continuation-in-part of applicants' copending application Ser. No. 332,200, filed Feb. 13, 1973 and now abandoned.

BACKGROUND OF THE INVENTION

1. Field of the Invention

The present invention relates to flavor enhancers and, more particularly, to substantially salt-free protein hydrolyzate flavor enhancers and to methods of preparing the same.

2. Description of the Prior Art

Protein hydrolyzates are incorporated into foods to increase nitritional value and to enhance the flavor of the foods. Until now, the hydrolyzates have exhibited an undesirably high salt content as an unavoidable incident of the process by which they are prepared. the typical salt content of solid protein hydrolyzates available in the market varies from 45 to 55%, and in liquid hydrolyzates from 20 to 25%. While salt is useful in helping to prevent spoilage in the protein hydrolyzate, high levels are undesirable because the product cannot be used in salt-free diets.

It is well known to product sugar-based, protein hydrolyzate flavor enhancers by reaction of a reducing sugar with an amino acid component (such as hydrolyzed protein). However, the methods presently utilized in the art to produce the hydrolyzed protein amino acid component are incapable of providing salt-free or substantially salt-free products. Specifically, the generally used method of preparing amino acid containing hydrolyzed proteins for reaction with reducing sugars comprises hydrolyzing protein starting material with hydrochloric acid and neutralizing the hydrolyzed amino acids with sodium carbonate. Such a method typically yields hydrolyzates containing 45–55% salt. As a result, the sugar-based flavor enhancers made therefrom contain undesirably large quantities of salt.

U.S. Pat. No. 3,480,447 discloses a process for preparing a seasoning preparation whereby an amino acid component is reacted with one or more reducing sugars in the presence of a lower aminoalkanesulfonic acid or salt. U.S. Pat. No. 3,493,395 discloses reacting amino acids obtained from protein hydrolyzates with reducing sugars in the presence of an oil or fat. U.S. Pat. No. 2,934,437 teaches reacting cysteine or cystine with a pentose or hexose monosaccharide to produce an artificial flavoring. While each of these prior art processes produce sugar-based hydrolyzates, the hydrolyzates are all salt-rich seasonings unsuitable for use in salt-free diets. Moreover, these processes have been found to produce seasonings exhibiting less than optimum flavor due to uncontrolled side reactions in the reducing sugar/amino acid reaction mixtures.

SUMMARY OF THE INVENTION

It is therefore an object of the present invention to provide a process for preparing sugar-based flavor enhancers which are substantially salt free.

It is another object of this invention to provide a process for the preparation of improved flavor sugar-based protein hydrolyzate flavor enhancers by virtue of reducing or eliminating adverse side reactions.

Other objects and advantages will become apparent from the following description and appended claims.

Briefly stated, in accordance with the aforesaid objects, the present invention provides a process for preparing substantially salt-free, subar-based protein hydrolyzate flavor enhancers which comprises hydrolyzing protein in an acid; liquefying starch, preferably with an enzyme such as alpha-amylase; and reacting the liquefied starch with the hydrolyzed protein in the presence of an enzyme, such as amyloglucosidase, which in situ converts the starch to reducing sugars. As quickly as the sugars are formed they react with the hydrolyzed protein to form the hydrolyzate flavor enhancers of the present invention. Following formation, the hydrolyzates may advantageously be concentrated to a solids content of 40 to 100%, by weight. The flavor of the hydrolyzates may be adjusted by addition of various amino acids and/or fatty acids.

DETAILED DESCRIPTION OF THE INVENTION

The present invention provides substantially salt-free (i.e., sodium chloride free), sugar-based protein hydrolyzates by non-enzymatic browning between in situ produced reducing sugars and the amino group from the amino acid constituent of hydrolyzed protein.

To prepare protein hydrolyzates, the protein used should preferably be high in total nitrogen, adequate in respect to all the amino acids, and a portion of all the protein used to prepare the protein hydrolyzates should preferably be high in glutamic acid, which contributes maximum flavor to the protein hydrolyzates. Exemplary of the numerous suitable protein materials for use in the present invention are wheat gluten, corn gluten, extracted soy flour, soy protein concentrates, soy protein isolates, casein, peanut flour, peanut protein concentrate, extracted cottonseed meal, cottonseed protein concentrate, cottonseed protein isolate, fish protein concentrate and dried distillers solubles. The proteins may be used singly or in various combinations. It is particularly preferred that the protein used should not contain appreciable amounts of carbohydrates or fatty material, since these contribute to excess humin formation on hydrolysis and an attendant loss of amino acids.

Presently known processes prepare protein hydrolyzates by hydrolyzing protein material with about 6N HCl, neutralizing the hydrolyzed amino acids with sodium carbonate and concentrating the resulting hydrolyzate. The salt content in a hydrolyzate prepared in this fashion varies from 45–55%. In accordance with the present invention, the salt content is substantially eliminated from the hydrolyzate by in situ enzymatic production of reducing sugars from starch followed by relatively low temperature reaction of the in situ formed sugars with the amino acids of the hydrolyzed protein. In its essential and preferred aspects, the present invention consists of three steps: (1) preparation of amino acids from protein; (2) liquefication of starch; and (3) amino acid-liquefied starch reaction under carefully controlled conditions in the presence of amyloglucosidase to form substantially salt-free, sugar-based protein hydrolyzates. The resulting hydrolyzate has enhanced sweetness and flavor, improved keeping qualities and thus increased storage life.

Preparation of amino acids from protein is accomplished by conventional acid hydrolysis using 2N to 12N hydrochloric acid, or its equivalent. The preferred normality of the acid for hydrolysis is 4N to 6N. Typically, 6N hydrochloric acid is heated to 60° – 190°C, preferably 110° – 120°C, in a steam jacketed, glass-lined reaction kettle equipped with an agitator. Protein material in an amount, by weight, about 50% greater than the hydrochloric acid is next added to the hot hydrochloric acid and heating is continued under reflux with continuous stirring for 2 to 10 hours, preferably about 5 to 6 hours. The resulting hydrolyzed protein may be filtered to remove insolubles, primarily humin, and the filtered material discarded. It will be appreciated that the solid black humin is formed during acid hydrolysis due to reaction between amino acids and carbohydrates. Thus, an excess of humin formation indicates a loss of amino acids. To suppress excess humin formation, it is recommended and desirable to use a protein component having a low carbohydrate content and a high percentage protein, such as wheat gluten. In addition to minimizing humin formation it is the object of the protein hydrolysis to also minimize chloride ion concentration and polypeptide formation while maximizing free amino nitrogen. It has been found that these objects are best accomplished when the hydrolysis is continued at least until about 80% of the hydrolyzed protein is present as free amino acid.

The hydrolyzed protein pH is very low, i.e. less than about 1.0. Since the subsequent reaction with liquefied starch to produce the hydrolyzates of the present invention is accomplished at pH's in the range 3.5 – 5.0, it is desirable to increase the pH of the hydrolyzed protein by removing excess acid. This can be most readily accomplished in accordance with the present invention by pumping the unfiltered hydrolyzed protein, or, if the humin has been removed, the hydrolyzed protein filtrate resulting from the humin filtration, into a glass lined vacuum kettle and distilling it under vacuum to about 1/10th of its volume, after which the concentrated hydrolyzed protein is diluted with distilled water and the vacuum concentration step is repeated to recover any excess hydrochloric acid in the reaction mixture. This dilution-concentration procedure can be repeated as often as necessary to raise the pH to as high as 2 – 2.5, the precise pH depending upon the number of repetitions of the procedure and the strength of the vacuum. For example, where the dilution-vacuum concentration procedure was repeated twice using a vacuum of about 2 m.m. Hg, the resultant pH was about 1.8. The concentrate from the final repetition of the procedure may then be diluted with about five times its own volume of distilled water and decolorized with activated carbon. While decolorization is an optional step, unless the protein is decolorized the product hydrolyzate will have a dark color and an off-flavor.

Liquefication of starch is preferably accomplished using alpha-amylase to break down the starch. Virtually any starch or combination of starches can be used in the present process. For example, readily available starches include wheat, corn, potato, and the like. The starch is slurried in about three times its weight of distilled water (although the starch concentration in the slurry may conveniently vary from about 15 to 50%, by weight) and sufficient calcium chloride is added to produce a calcium ion concentration in the slurry ranging from 0.01 to 0.05 molar. Since the calcium ion serves to enhance the activity of the enzyme, and a high concentration of calcium in the system is undesirable, 0.01 molar appears to be the optimum calcium ion level in the slurry. At this point the slurry pH is advantageously adjusted to the range 5 to 8 and the enzyme alpha-amylase added to the slurry. It will be appreciated that the amylase can be in liquid or powder form and may be derived from any source, i.e., plant, animal or micro-organism, depending upon the end use of the hydrolyzate. It has been found that the presence of excess enzyme during liquefication contributes to undesirable side reactions and darkening of the liquefied starch, and therefore is to be avoided. The precise amount of amylase to optimize the liquefication depends upon the starch source and amount of starch present; however, an often reliable guide is to use about 0.1% liquid alpha-amylase or 0.05% powdered alpha-amylase based on the starch weight. Preferably, the slurry is adjusted to a pH of about 6.8 and is heated, with powerful agitation, to from 55° to 100°C, preferably 85° to 87°C, for about 10 to 100 minutes, preferably 30 to 40 minutes. As a practical matter, maximum starch viscosity occurs in the range 68° – 75°C, usually at about 72°C. and it may be necessary to hold the heating at this temperature for about 15 minutes until a viscosity break occurs before continuing the heating to the 85° – 87°C range. Because the starch is a thick mass at these temperatures, a motor driven metallic stirrer, or its equivalent, is preferred for agitation.

As an alternative to alpha-amylase liquefication, the starch can be liquefied with dilute, i.e., 0.02M – 0.2M, acid solutions. The preferred acid, concentration and acid liquefication conditions are 0.2M hydrochloric acid at 60° – 180°C and 10 – 15 psi.

The decolorized amino acids derived from protein hydrolysis are admixed with the liquid starch to form admixtures containing from 10:1 to 1:10, desirably 1:1 to 1:10, by weight, of hydrolyzed protein to starch, and the pH of the mixture is adjusted to the range 3.5 to 5, but preferably from 3.5 to 4.0. The weight ratio of hydrolyzed protein to starch selected depends upon the desired level of flavor in the hydrolyzate product. Generally, the greater the percent of amino acids in the admixture, the greater the percent amino nitrogen and the greater the flavoring in the final product. However, amino acid quantities in excess of the 1:1 hydrolyzed protein to starch ratio do not appear to contribute to increased flavor. Moreover, the use of a larger proportion of amino acid than is represented by the 1:1 ratio is expensive and renders the resulting product economically impractical. By the same token, proportions of starch greater than about 1:2 tend to mask the flavor of the resulting hydrolyzate product. Therefore, the preferred admixture ratios are in the range 1:1 to 1:2, by weight, of hydrolyzed protein to liquefied starch. Since the liquefied starch has a pH of about 7.0 – 7.1, its addition to the relatively low pH hydrolyzed protein has a diluting effect with a consequent pH increase. For example, if the pH of the hydrolyzed protein is in the range 2 – 2.5, the pH of a 1:1 admixture of hydrolyzed protein and starch is about 2.8 and the pH of a 1:2 admixture is about 2.9. If a 1:5 admixture is employed the pH can be increased to about 3.2. However, it has been observed that this large a pH increase is obtained only at the expense of a flavor intensity loss in the final product due to the flavor masking effect of the starch.

The reaction between the amino acid and the liquefied starch occurs only in the presence of an enzyme such as amyloglucosidase. It has been found that the enzyme operates effectively in the pH range from 3.5 – 5.0, but has optimal activity in the pH range 3.5 – 4.0. To raise the pH of the amino acid-liquefied starch admixture to at least 3.5 requires the addition of an alkali, such as sodium hydroxide. For obvious reasons, the higher the pH of the admixture the less alkali is required. Since the added alkali reacts with any residual uncombined HCl to form NaCl, it follows that the higher the pH of the admixture the lower the salt content of the final hydrolyzate product. Where sufficient alkali is added to raise the pH of the admixture from about 2.8 – 2.9 to about 3.5 – 3.8, the resulting hydrolyzate product contains about 4 – 5% salt.

If it is desired to substantially reduce the salt content of the final product, the protein hydrolyzate following vacuum concentration and preferably following decolorization can be passed through an ion-exchange bed to remove excess HCl and to raise the pH to about 3.0 – 3.2. When the pH 3.0 – 3.2 hydrolyzed protein is admixed with the liquefied starch, the diluting effect of the starch is sufficient to raise the pH into the 3.5 – 4.0 optimum activity range for the amyloglucosidase. Where ion exchange is employed to this extent, alkali additions are unnecessary to adjust the pH and the only salt present in the final product comes from the reaction of HCl in the hydrolyzed protein with sodium ion contamination present on the ion exchange bed. Most suitable for use as ion exchange resins in the present process are the well known weak-base anion exchange resins and the intermediate-base anion exchange resins, which are generally amine derivatives of chloromethylated polystyrene, condensation products of epichlorohydrin with amines or ammonia, and aminated condensation products of phenol and formaldehyde. Exemplary commercial resins of these types are sold under the trademark "Duolite" by Diamond Shamrock Chemical Company, and are designated Duolite ES-340, Duolite A-6 and Duolite A-7. It will be appreciated that by controlling the ion exchange process parameters, such as flow rate, column height, and the like, the extent of ion exchange can be controlled and the pH of the hydrolyzed protein can therefore be regulated as desired. Thus, in the event it is deemed desirable to add salt to the final hydrolyzate product for purposes of flavor enhancement and increased storage life, the ion exchange process parameters can be adjusted so that the hydrolyzed protein following the ion exchange has a regulated pH less than about 3.0 – 3.2 (the pH at which no alkali additions are necessary). By regulating the pH in this manner, the amount of alkali necessary to raise the pH to the optimal activity range for the enzyme can be controlled to produce a product having the desired salt content.

Amyloglucosidase is added to the pH adjusted amino acid-liquefied starch mixture in quantities, based on the amount of starch present, just sufficient to achieve the desired conversion by hydrolysis of starch to reducing sugars. For example, it is known that 80 units of amyloglucosidase will completely convert 1 pound of starch to dextrose in 60–96 hours at about 60°C. Thus to convert 100% of 100 pounds of starch to dextrose, i.e., a dextrose equivalent (DE) of 100, 8,000 units (80 ml.) of amyloglucosidase is required. However, a DE of 100 is unnecessary as a practical matter. In fact, from a time economy viewpoint, a DE at the top of the range 30–60 is preferred, although DE's of 20–99 are readily attainable. The extent of hydrolysis can be controlled by time, pH and amount of enzyme. However, excess enzyme leads to undesirable side reactions and side reaction products which darken the final protein hydrolyzate.

The amyloglucosidase converts the liquefied starch to a reducing sugar in situ, at a relatively slow rate. As the sugar is produced, as long as the temperatures are maintained relatively low, i.e., in the range 40° – 75°C, preferably 60°C, the browning reaction of the sugar with the amino acid predominates to form the substantially salt-free, sugar-based protein hydrolyzate of the present invention. However, at higher temperatures, competing polymerization and caramelization reactions involving the reducing sugars tend to become of increased significance with the result that side reaction products having an adverse effect upon hydrolyzate flavor are produced. Thus it is essential that temperatures be maintained below 75°C if the advantageous results of the present invention are to be realized. At these low temperatures, reaction time can vary from 10 to 90 hours, but is generally 30 – 40 hours where the reaction takes place under preferred pH and temperature conditions.

The advantage of in situ production of the reducing sugars is that the relatively slow production rate permits the low temperature favored browning reaction to totally dominate the competing side reactions, such as high temperature favored polymerization and carmelization, in the competition for the produced sugars. If, on the other hand, the reducing sugars were added in massive quantities to the amino acids, even at low temperatures, there would be sufficient sugar present to fuel both the browning and the competing reactions, with the result that the protein hydrolyzate produced by browning would be contaminated by the polymerization and caramelization reaction products which have been found to adversely influence the hydrolyzate flavor.

As hereinbefore indicated, the preferred enzyme for reaction is amyloglucosidase (which is obtainable from micro-organisms), although β-D glucoside glucohydrolyase, obtainable from almonds, is also useful. Reducing sugars involved in non-enzymatic browning reactions broadly include aldoses (pentoses, hexoses, or disaccharides), uronic acids and ketoses, although dextrose is the primary reducing sugar resulting from enzymatic conversion of starch. The interaction between an aldose or uronic acid and any type of primary or secondary amine (amino acid) can lead to browning, although there is a considerable variation in the reactivities of both sugars and amines.

Following reaction to form the protein hydrolyzates, the hydrolyzates are filtered and concentrated at low temperatures under vacuum, up to a solids content of 80–85%, by weight. Filtration can be achieved either by centrifugation or by any suitable filtration equipment, such as a Buchnner funnel with fine cloth or semi-permeable membrane. Concentration can be accomplished, for example, in a rotary evaporator at temperatures ranging from 40° to 120°C, and preferably from 90° to 95°C. Although concentration of the hydrolyzate can vary from 40 to 100% (100% solids is a dry powder), if the percent solids in the concentrated hydrolyzate is less than 55%, storage life is a problem due to microbial spoilage. On the other hand, at solids levels in the concentrated hydrolyzate of more than 80%, sugars in the hydrolyzate crystallize and mask the beefy flavor of the product. The preferred concentration of solids in the protein hydrolyzate is about 70%.

If desired, fatty acids, such as oleic acid, monoenoic acid and the like, can be added individually or in combination to the protein hydrolyzates following filtration and prior to concentration. In addition, individual amino acids or combinations thereof may optionally be employed, for example by addition to the amino acid-liquefied starch reaction mixture, to enhance the flavor of the resulting product. Non-essential amino acids in most instances contribute better flavor than the essential amino acids. For example glycine, alanine, proline, leucine, serine, phenylalanine and aspartic acids have varying sweet taste and addition of these amino acids contributes beneficially to the hydrolyzate flavor. Methionine and cysteine impart the definite desirable taste of roasted meaty flavor and are preferred amino acid additives. Valine and tyrosine are slightly bitter. It will therefore be appreciated that a protein hydrolyzate containing all or most of the amino acids has the constituents present to supply full and complete taste characteristics.

The invention will be better understood from the following illustrative examples:

EXAMPLE I

Prior Art Process

Two hundred and fifty grams (250 g.) of 6N hydrochloric acid was heated in a round bottomed flask to 120°C. One hundred grams (100 g.) of wheat gluten (% protein 74.5) was added and the gluten and acid were heated for 5 hours at 120°C with constant stirring. After completing hydrolysis, the humin formed was filtered. The filtrate (hydrolyzate) was then concentrated to one-third of its volume. After dilution with distilled water the hydrolyzate was again concentrated. The concentrated hydrolyzate was diluted to two hundred fifty grams (250 g.) with distilled water and decolorized with one gram (1 g.) of activated carbon by heating at 80°C for 1 hour. The decolorized filtrate was neutralized to pH 5.2 with sodium carbonate. The neutralized wheat gluten hydrolyzate was concentrated and dried to obtain a powdered protein hydrolyzate.

Analysis:

| | |
|---|---|
| % Humin formed (by weight) | 9.55 |
| % Sodium chloride in the powdered protein hydrolyzate (by weight) | 51.41 |
| % Amino nitrogen in the protein hydrolyzate (by weight) | 3.65 |

EXAMPLE II

Step 1

Two hundred and fifty grams (250 g.) of 6N hydrochloric acid was heated in a round bottomed flask to 120°C. One hundred grams (100 g.) of wheat gluten (% protein 74.5) was added to the hot acid and the gluten and acid were heated for 5 hours at 120°C with stirring. After hydrolysis, the humin formed was filtered. The filtrate (hydrolyzate) containing in excess of 80% free amino acids based upon the starting material protein was concentrated to one third its volume to recover excess hydrochloric acid. The resulting concentrate was diluted with distilled water and concentration was repeated. This second concentration step recovered excess hydrochloric acid. The concentrated hydrolyzed protein was diluted with water to two hundred fifty grams (250 g.) (resulting hydrolyzate pH 1.75) and decolorized with two grams (2 g.) of activated carbon by heating at 80°C for 1 hour.

Step 2

One hundred eleven grams (111 g.) of starch was made a slurry in three hundred thirty three grams (333 g.) of distilled water. 0.2 grams of calcium chloride was added to the slurry and the pH adjusted to 6.8. 0.25 ml of alpha-amylase was added and the slurry heated to 85°C with vigorous agitation. The temperature of 85°C and the stirring was maintained and continued for 40 minutes to obtain complete liquefication of the starch.

Step 3

200 grams of the pH 1.75, decolorized, hydrolyzed wheat gluten from Step 1 was mixed with 200 grams of liquefied starch from Step 2 and the pH of the mixture was adjusted to 3.5 by addition of concentrated sodium hydroxide solution. 0.5 ml of amyloglucosidase was added and the gluten-starch-enzyme mixture incubated at 60°C for 72 hours. The resulting protein hydrolyzate was filtered and concentrated at low temperature under vacuum to about 68% solids by weight.

Analysis:

| | |
|---|---|
| % Amino nitrogen in the protein hydrolyzate (by weight) | 0.92 |
| % Sodium chloride in the protein hydrolyzate (by weight) | 8.9 |

The final product protein hydrolyzate obtained was brown in color and had a beefy flavor with a little sweetness. No flavor or storage problems were observed after storing the product for 2 months at room temperature.

EXAMPLE III

Step 1

Two hundred and fifty grams (250 g.) of 6N hydrochloric acid was heated in a round bottomed flask to 120°C. A mixture of fifty grams (50 g.) of wheat gluten and fifty grams (50 g.) of defatted soy flour was added to the hot acid and the acid - gluten - soy flour mixture was heated for 5 hours at 120°C with constant stirring. After completing hydrolysis, the humin formed was filtered. The filtrate (hydrolyzate) containing in excess of 80% free amino acids based upon the starting material protein was concentrated to one third of its volume to recover excess hydrochloric acid. The resulting concentrate was diluted with distilled water and concentration was repeated. The concentrated hydrolyzed protein was diluted with water to two hundred fifty grams (250 g.) (resulting hydrolyzate pH 1.82) and decolorized with two grams (2 g.) of activated carbon by heating at 80°C for 1 hour.

Step 2

One hundred eleven grams (111 g.) of starch was made a slurry in three hundred thirty three grams (333 g.) of distilled water. 0.2 grams of calcium chloride was added to the slurry and the pH adjusted to 6.8. 0.25 ml of alpha-amylase was added and the slurry heated to 85°C with vigorous stirring for 40 minutes to obtain complete liquefication of the starch.

Step 3

200 grams of the pH 1.82, decolorized, hydrolyzed mixture of wheat gluten and defatted soy flour from Step 1 was mixed with 200 grams of liquefied starch from Step 2 and the pH of the reaction mixture adjusted to 3.5 by addition of concentrated sodium hydroxide solution. 0.5 ml of amylglucosidase was added and the gluten - soy flour - starch - enzyme mixture incubated at 60°C for 72 hours. The resulting hydrolyzate was filtered and concentrated at low temperature under vacuum to about 71% solids by weight.

Analysis:

| | |
|---|---|
| % Amino nitrogen in the protein hydrolyzate (by weight) | 0.75 |
| % Sodium chloride in the protein hydrolyzate (by weight) | 8.7 |

The final product protein hydrolyzate obtained was dark brown in color and had a pleasant beefy flavor with little sweetness. The product has a good storage life.

EXAMPLE IV

Step 1

Two hundred and fifty grams (250 g.) of 6N hydrochloric acid was heated in a round bottomed flask to 120°C. A mixture of thirty grams (30 g.) of wheat gluten, thirty grams (30 g.) defatted soy flour and thirty grams (30 g.) casein was added to the hot acid, and the acid - protein mixture was heated for 5 hours at 120°C with constant stirring. After reaction, the humin formed was filtered. The filtrate (hydrolyzate) containing in excess of 80% free amino acids based upon the starting material protein was concentrated to one third its volume, diluted with distilled water and concentrated again to recover excess hydrochloric acid in the hydrolyzate. The concentrated hydrolyzed protein was diluted to two hundred fifty grams (250 g.) (resulting hydrolyzate pH 1.77) and decolorized with two grams (2 g.) of activated carbon by heating at 80°C for 1 hour.

Step 2

One hundred eleven grams (111 g.) of starch was made a slurry in three hundred thirty three grams (333 g.) of distilled water. 0.2 grams of calcium chloride was added to the slurry and the pH adjusted to 6.8. 0.25 ml of alpha-amylase was added and the slurry heated at 85°C with vigorous stirring for 40 minutes to obtain complete liquefication of the starch.

Step 3

Two hundred grams (200 g.) of the pH 1.77, decolorized, hydrolyzed wheat gluten, defatted soy flour and casein from Step 1 was mixed with one hundred fifty grams (150 g.) of liquefied starch from Step 2 and the pH of the mixture adjusted to 3.5 by addition of concentrated sodium hydroxide solution. 0.5 ml of amyloglucosidase was added and the gluten - soy flour - casein - starch - enzyme mixture incubated at 60°C for 72 hours. The reaction product was filtered and concentrated under vacuum to about 72% solids by weight.

Analysis:

| | |
|---|---|
| % Amino nitrogen in protein hydrolyzate (by weight) | 1.1 |
| % Sodium chloride in protein hydrolyzate (by weight) | 10.7 |

The final product protein hydrolyzate obtained was dark brown in color and had a beefy flavor with little sweetness. The product had a good storage life.

EXAMPLE V

Step 1

250 g. of 6N hydrochloric acid was heated to 120°C. A mixture of 50 g. of wheat gluten and 50 g. of defatted soy flour was added slowly to the hot acid and refluxed for 5 hours at 120°C with stirring. The humin formed was filtered. The filtrate (hydrolyzate) containing in excess of 80% free amino acids based upon the starting material protein was concentrated to one third its volume to recover excess hydrochloric acid, after which it was diluted with distilled water and reconcentrated. The concentrated protein hydrolyzate was diluted with water (resulting hydrolyzate pH 1.75) and decolorized with activated carbon as set forth in Step 1 of Example II.

Step 2

111 grams of starch was made a slurry in 333 grams of distilled water. 0.2 grams of calcium chloride was added and the pH of the slurry was adjusted to 6.8. 0.25 ml of alpha-amylase was added and the slurry heated to 85°C with vigorous stirring for 45 minutes to obtain complete liquefication of the starch.

Step 3

200 grams of the pH 1.75, decolorized, hydrolyzed wheat gluten and defatted soy flour from Step 1 and 5 g. of cysteine were mixed with 150 grams of liquefied starch from Step 2 and the pH adjusted to 3.5 by addition of concentrated sodium hydroxide solution. 0.5 ml of amyloglucosidase was added and the wheat gluten - soy flour - cysteine - starch - enzyme mixture incubated at 60°C for 72 hours. After reaction the protein hydrolyzate was filtered and concentrated under vacuum to about 70% solids by weight.

Analysis:

| | |
|---|---|
| % Amino nitrogen in protein hydrolyzate (by weight) | 1.67 |
| % Sodium chloride in protein hydrolyzate (by weight) | 10.2 |

The final product protein hydrolyzate obtained was dark brown in color and had a roasted beefy flavor. The product had a good storage life.

EXAMPLE VI

Step 1

Four separate portions of 250 g. of 6N hydrochloric acid each were heated to 120°C. A mixture of 50 g. of wheat gluten plus 50 grams of defatted soy flour was added to each portion of the hot acid with stirring and the mixtures were refluxed for 5 hours at 120°C with stirring. The humin formed in each portion was filtered. The filtrate (hydrolyzate) from each portion which contained in excess of 80% free amino acids based upon the starting material protein, was vacuum concentrated to one third its volume, after which it was diluted with distilled water and the vacuum concentration repeated. Next the concentrated protein hydrolyzate from each portion was diluted with water (resulting hydrolyzate pH for each portion was 1.15, 1.45, 1.60, 1.60 due to variations in vacuum strength) and decolorized with activated carbon as set forth in Step 1 of Example II.

Step 2

666 grams of starch was made a slurry in 2000 grams of distilled water. 0.4 grams of calcium chloride was added to the starch slurry and the pH adjusted to 6.8 1.25 ml of alpha-amylase was added and heated to 85°C with vigorous stirring for 45 minutes to obtain complete liquefication of the starch.

Step 3

| A | B | C | D |
|---|---|---|---|
| 200 g. of the pH 1.15, decolorized, hydrolyzed wheat gluten and defatted soy flour from Step 1 was mixed well with 50 g. of liquefied starch from Step 2 and the pH adjusted to 3.5 by addition of concentrated NaOH. 0.4 ml of amyloglucosidase was added and the mixture incubated at 60°C for 72 hours. After reaction the protein hydrolyzate was concentrated under vacuum. | 200 grams of the pH 1.45, decolorized, hydrolyzed wheat gluten and defatted soy flour from Step 1 wax mixed well with 100 g. of liquefied starch from Step 2 and the pH adjusted to 3.5 by addition of concentrated NaOH. 0.5 ml of amyloglucosidase was added and the mixture incubated at 60°C for 72 hours. After reaction the protein hydrolyzate was concentrated under vacuum. | 200 g. of the pH 1.60, decolorized, hydrolyzed wheat gluten and defatted soy flour from Step 1 was mixed well with 250 g. of liquefied starch from Step 2 and the pH adjusted to 3.5 by addition of concentrated NaOH. 0.7 ml of amyloglucosidase was added and the mixture incubated at 60°C for 72 hours. After reaction the protein hydrolyzate was concentrated under vacuum. | 200 g. of the pH 1.60, decolorized hydrolyzed wheat gluten and defatted soy flour from Step 1 was mixed well with 450 g. of liquefied starch from Step 2 and the pH adjusted to 3.5 by addition of concentrated NaOH. 1.2 ml of amyloglucosidase was added and the mixture incubated at 60°C for 72 hours. After reaction the protein hydrolyzate was concentrated under vacuum. |

Analysis: (All percentages are percent by weight)

| A | B | C | D |
|---|---|---|---|
| % Solids in the concentrated protein hydrolyzate...69.4<br>% Amino nitrogen in protein hydrolyzate...2.00<br>% Sodium chloride in protein hydrolyzate...18.4<br>The sugar based-protein hydrolyzate was light brown in color and beefy in flavor. | % Solids in the concentrated protein hydrolyzate...70.1<br>% Amino nitrogen in protein hydrolyzate...1.81<br>% Sodium chloride in protein hydrolyzate...12.9<br>The sugar based-protein hydrolyzate was brown in color and beefy in flavor. | % Solids in the concentrated protein hydrolyzate...71.2<br>% Amino nitrogen in protein hydrolyzate...1.24<br>% Sodium chloride in protein hydrolyzate...7.2<br>The sugar based-protein hydrolyzate was dark brown in color and with sweetness and beefy flavor. | % Solids in the concentrated protein hydrolyzate...68.2<br>% Amino nitrogen in protein hydrolyzate...0.85<br>% Sodium chloride in protein hydrolyzate...5.9<br>The sugar based-protein hydrolyzate was dark brown in color but sweetness in the product suppressed the beefy flavor due to an excess of reducing sugars. |

EXAMPLE VII

Step 1

250 grams of 6N hydrochloric acid was heated to 120°C. A mixture of 50 grams of wheat gluten and 50 grams of defatted soy flour was added slowly to the hot acid with stirring and refluxed for about 5 hours. The humin formed during acid hydrolysis was filtered. The filtrate (hydrolyzate) containing in excess of 80% free amino acids based upon the starting material protein was concentrated to one third of its volume, diluted with distilled water and reconcentrated to recover excess hydrochloric acid. The resulting concentrated protein hydrolyzate was diluted with water (resulting hydrolyzate pH 1.75) and decolorized with activated carbon as set forth in Step 1 of Example II.

Step 2

111 grams of starch was made a slurry in 333 grams of distilled water. 0.2 g. of calcium chloride was added and the pH adjusted to 6.8. 0.25 ml of alpha-amylase was added and the slurry heated to 85°C with vigorous stirring for 45 minutes to obtain complete liquefication of the starch.

Step 3

200 grams of the pH 1.75, decolorized, hydrolyzed wheat gluten and defatted soy flour from Step 1 was mixed with 150 grams of liquefied starch from Step 2 and the pH adjusted to 3.5 by addition of concentrated sodium hydroxide solution. 0.5 ml of amyloglucosidase was added and the wheat gluten - soy flour - starch - enzyme mixture incubated at 60°C for 72 hours. The hydrolyzate was filtered and 5 g. of oleic acid was added to the filtrate after which it was concentrated under vacuum to about 69% solids by weight.

Analysis:

| | |
|---|---|
| % Amino nitrogen in protein hydrolyzate (by weight) | 1.56 |
| % Sodium chloride in protein hydrolyzate (by weight) | 10.4 |

The sugar based - protein hydrolyzate product with added fatty acid had a roasted beefy flavor with a very desirable aroma.

EXAMPLE VIII

Step 1

250 grams of 6N hydrochloric acid was heated to 120°C. A mixture of 40 grams of wheat gluten and 40 grams of casein was added slowly with stirring to the hot acid and the acid mixture heated for 5 hours at 120°C with stirring. The humin formed during acid hydrolysis was filtered. The filtrate (hydrolyzate) containing in excess of 80% free amino acids based upon the starting material protein was concentrated to one third its volume after which it was diluted with distilled water and reconcentrated to recover excess hydrochloric acid. The concentrated protein hydrolyzate was diluted with water (resulting hydrolyzate pH 1.6) and decolorized with activated carbon as set forth in Step 1 of Example II.

Step 2

111 grams of starch was made a slurry in 333 grams of distilled water. 0.2 grams of calcium chloride was added and the pH of the slurry adjusted to 6.8. 0.25 ml of alpha-amylase was added and heated to 85°C, with vigorous stirring for 45 minutes to obtain complete liquefication of starch.

Step 3

200 grams of the pH 1.6, decolorized, hydrolyzed wheat gluten and casein from Step 1 was mixed well with 150 ml of liquefied starch from Step 2, g. of methionine and 1 g. of cysteine and the pH adjusted to 3.5 by addition of concentrated sodium hydroxide solution. 0.5 ml of amyloglucosidase was added and the mixture incubated at 60°C for 72 hours. After reaction, the protein hydrolyzate was filtered and concentrated under vacuum to about 72% solids by weight.

Analysis:

| | |
|---|---|
| % Amino nitrogen in the protein hydrolyzate (by weight) | 2.15 |
| % Sodium chloride in protein hydrolyzate (by weight) | 10.7 |

The sugar based - protein hydrolyzate product had a high beefy flavor due to addition of cysteine and methionine, with little sweetness. The product had good storage life.

EXAMPLE IX

Step 1

Two hundred and fifty grams (250 g.) of 6N hydrochloric acid was heated in a round bottomed flask to 120°C. One hundred grams (100 g.) of wheat gluten (% protein 74.5) was added to the hot acid and the gluten and acid were heated for 5 hours at 120°C with stirring. After hydrolysis, the humin formed was filtered. The filtrate (hydrolyzate) containing in excess of 80% free amino acids based upon the starting material protein was concentrated to one third its volume to recover excess hydrochloric acid for recycling. The concentrated hydrolyzed protein was diluted to two hundred fifty grams (250 g.) and decolorized with two grams (2 g.) of activated carbon by heating at 80°C for 15 minutes. The decolorized hydrolyzate was passed through a Duolite A-6 weak base anion exchange resin at a rate of 2 gallons/minute to remove additional hydrochloric acid and to raise the hydrolyzate pH to 3.2-3.3.

Step 2

One hundred eleven grams (111 g.) of starch was made a slurry in three hundred thirty three grams (333 g.) of distilled water. 0.2 grams of calcium chloride was added to the slurry and the pH adjusted to 6.8. 0.25 ml of alpha-amylase was added and the slurry heated to 85°C with vigorous agitation. The temperature of 85°C and the stirring was maintained and continued for 40 minutes to obtain complete liquefication of the starch.

Step 3

200 grams of the pH 3.2-3.3, ion exchanged, decolorized, hydrolyzed wheat gluten from Step 1 was mixed with 200 grams of liquefied starch from Step 2. The pH of the mixture was 3.8 and needed no adjustment. 0.5 ml of amyloglucosidase was added and the gluten-starch-enzyme mixture incubated at 60°C for 45 hours. The resulting protein hydrolyzate was filtered and concentrated at low temperature under vacuum to about 68% solids by weight.

The final product protein hydrolyzate contained 2.7% sodium chloride by weight.

EXAMPLE X

Step 1

Two hundred and fifty grams (250 g.) of 6N hydrochloric acid was heated in a round bottomed flask to 120°C. One hundred grams (100 g.) wheat gluten (% protein 74.5) was added to the hot acid and the acid - gluten mixture was heated for 5 hours at 120°C with constant stirring. After completing hydrolysis, the humin formed was filtered. The filtrate (hydrolyzate) containing in excess of 80% free amino acids based upon the starting material protein was concentrated to one third of its volume to recover excess hydrochloric acid for recycling. The concentrated hydrolyzed protein was diluted to two hundred fifty grams (250 g.) and decolorized with two grams (2 g.) of activated carbon by heating at 80°C for 15 minutes. The decolorized hydrolyzate was passed through a Duolite A-6 weak base anion exchange resin at a rate of 3 gallons/minute to remove additional hydrochloric acid and to raise the hydrolyzate pH to 2.9.

Step 2

One hundred eleven grams (111 g.) of starch was made a slurry in three hundred thirty three grams (333 g.) of distilled water. 0.2 grams of calcium chloride was added to the slurry and the pH adjusted to 6.8. 0.25 ml of alpha-amylase was added and the slurry heated to 85°C with vigorous stirring for 40 minutes to obtain complete liquefication of the starch.

Step 3

200 grams of the pH 2.9, ion-exchanged, decolorized, hydrolyzed wheat gluten from Step 1 was mixed with 200 grams of liquefied starch from Step 2 and the pH of the reaction mixture adjusted to 3.5 by addition of concentrated sodium hydroxide solution. 0.5 ml of amyloglucosidase was added and the gluten - starch - enzyme mixture incubated at 60°C for 45 hours. The resulting protein hydrolyzate was filtered and concentrated at low temperature under vacuum to about 68% solids by weight.

The final product protein hydrolyzate contained 2.78% sodium chloride by weight.

While the present invention has been described with reference to particular embodiments thereof, it will be understood that numerous modifications can be made by those skilled in the art without actually departing from the scope of the invention. Accordingly, all modifications and equivalents may be resorted to which fall within the scope of the invention as claimed.

What is claimed as new is as follows:

1. A process for preparing substantially salt-free protein hydrolyzate flavor enhancers comprising the steps of:
  a. hydrolyzing protein in an acid;
  b. removing excess acid;
  c. liquefying starch; and
  d. admixing the hydrolyzed protein, the liquefied starch and an enzyme selected from the group consisting of amyloglucosidase and β-D glucoside glucohydrolyase at a pH in the range 3.5 to 5 and a temperature in the range 40° to 75°C, whereby said enzyme and said liquefied starch react to produce reducing sugars which in turn react with said hydrolyzed protein to form substantially salt-free protein hydrolyzates.

2. A process, as claimed in claim 1, wherein said protein is hydrolyzed until at least about 80% of the hydrolyzed protein is present as free amino acid.

3. A process, as claimed in claim 1, wherein the temperature of said protein-starch-enzyme admixture is about 60°C.

4. A process, as claimed in claim 1, wherein said protein and said starch are admixed in a ratio, by weight, of from 1:1 to 1:10, respectively.

5. A process, as claimed in claim 1, wherein said enzyme is amylglucosidase.

6. A process, as claimed in claim 1, wherein said acid hydrolysis of protein comprises admixing said protein with 2N to 12N hydrochloric acid and heating said protein-acid mixture to a temperature in the range 60° to 190°C.

7. A process, as claimed in claim 6, wherein said hydrochloric acid is 6N and said temperature is 110°–120°C.

8. A process, as claimed in claim 7, wherein said temperature is maintained for about 5 to 6 hours.

9. A process, as claimed in claim 1, wherein said hydrolyzed protein is decolorized with activated carbon.

10. A process, as claimed in claim 1, wherein said protein is admixed with about 4N to 6N hydrochloric acid at 110° to 120°C for from 5 to 6 hours, said hydrolyzed product is filtered and decolorized with activated carbon.

11. A process, as claimed in claim 1, wherein said starch is liquefied by water slurrying with alpha-amylase in the presence of calcium ion at a pH in the range 5 to 8 and said slurry is heated with vigorous agitation to a temperature in the range 55° to 110°C.

12. A process, as claimed in claim 11, wherein said calcium ion concentration is in the range 0.01 to 0.05 molar.

13. A process, as claimed in claim 12, wherein said slurry pH is about 6.8 and said slurry is heated to a temperature in the range 85° to 87°C.

14. A process, as claimed in claim 13, wherein said slurry is maintained in the range 85° to 87°C for about 30 to 40 minutes.

15. A process, as claimed in claim 1, wherein said excess acid is removed by a process which comprises vacuum distilling said hydrolyzed protein.

16. A process, as claimed in claim 15, wherein said vacuum distilled hydrolyzed protein is diluted with water and again vacuum distilled.

17. A process, as claimed in claim 15, wherein said hydrolyzed protein is vacuum distilled to about 1/10th of its volume.

18. A process, as claimed in claim 15, wherein said hydrolyzed protein is filtered to remove insolubles prior to said vacuum distillation and wherein the concentrate resulting from vacuum distillation is decolorized with activated carbon.

19. A process, as claimed in claim 1, wherein said excess acid is removed by a process comprising:
1. vacuum distilling said hydrolyzed protein to remove a portion of said acid and to form a hydrolyzate concentrate;
2. diluting said concentrate with water; and
3. passing said diluted concentrate through an ion exchange resin to remove additional acid.

20. A process, as claimed in claim 19, wherein the pH of said hydrolyzed protein following ion exchange is in the range 3.0–3.2.

21. A process, as claimed in claim 2, wherein the pH of said protein-starch-enzyme admixture is in the range 3.5 to 4.

22. A process, as claimed in claim 21, wherein said protein and said starch are admixed in a ratio, by weight, of from 1:1 to 1:10, respectively.

23. A process, as claimed in claim 22, wherein said hydrolyzed protein is filtered, the filtrate is vacuum distilled to remove excess acid, and the concentrate resulting from vacuum distillation is decolorized with activated carbon.

24. A process for preparing substantially salt-free protein hydrolyzate flavor enhancers comprising the steps of:
a. hydrolyzing protein in 2N to 12N hydrochloric acid at a temperature in the range 60° to 190°C, filtering said hydrolyzed protein, removing excess acid from said hydrolyzed protein to increase the pH thereof, and decolorizing the hydrolyzed protein with activated carbon;
b. water slurrying starch with alpha-amylase in the presence of calcium ion at a pH in the range 5 to 8 and heating said slurry with vigorous agitation to a temperature in the range of 55 to 110°C to liquefy the starch; and
c. admixing the decolorized, hydrolyzed protein, the liquefied starch and amyloglucosidase at a pH in the range 3.5 to 5 and a temperature in the range 40° to 75°C, whereby said amyloglucosidase and said liquefied starch react to produce reducing sugars which in turn react with said decolorized, hydrolyzed protein to form substantially salt-free protein hydrolyzates.

25. A process, as claimed in claim 24, wherein said protein is hydrolyzed until at least about 80% of the hydrolyzed protein is present as free amino acid; said excess acid is removed by a process which comprises vacuum distilling said hydrolyzed protein; and, said hydrolyzed protein and said liquefied starch are admixed in a ratio, by weight, of from 1:1 to 1:10.

26. A process, as claimed in claim 25, wherein said process for removing excess acid further includes passing said hydrolyzed protein through an ion exchange resin.

27. A process, as claimed in claim 25, wherein said hydrolyzed protein and said liquefied starch are admixed in a ratio, by weight, of from 1:1 to 1:2.

28. A process, as claimed in claim 25, wherein said hydrochloric acid is about 4N to 6N, said calcium ion concentration is 0.01 to 0.05 molar and the pH of said protein-starch-amyloglucosidase admixture is adjusted to the range 3.5 to 4.0.

29. A process, as claimed in claim 28, wherein said protein is selected from the group consisting of wheat and soy products and by-products, and mixtures thereof.

30. A process, as claimed in claim 25, further including the step of concentrating the protein hydrolyzates to a solids content from about 40 to 100%, by weight.

31. A process, as claimed in claim 30, wherein said protein hydrolyzates are concentrated to a solids content of from 55 to 80%, by weight.

32. A process, as claimed in claim 25, further including the step of admixing said substantially salt-free protein hydrolyzates with a fatty acid.

33. A process, as claimed in claim 32, wherein said fatty acid is selected from the group consisting of oleic acid, monoenoic acid and mixtures thereof.

34. A process, as claimed in claim 25, further including the step of adding at least one amino acid to the protein-starch-amyloglucosidase admixture to adjust the flavor characteristics of the protein hydrolyzate.

35. A process, as claimed in claim 34, wherein said amino acid is selected from the group consisting of cysteine, methionine and mixtures thereof.

36. The product of the process of claim 1.

37. A product, as claimed in claim 36, including not more than about 2%, by weight, free amino nitrogen.

38. A product, as claimed in claim 36, including not more than about 10%, by weight, sodium chloride.

39. The product of the process of claim 25.

* * * * *